Aug. 11, 1959   R. G. BIRR   2,899,225
UNIVERSAL JOINT

Filed June 27, 1957   2 Sheets-Sheet 1

INVENTOR
RUDOLPH G. BIRR
BY
*Smith, Olsen, Baird & Miller*
ATTY'S.

Aug. 11, 1959 R. G. BIRR 2,899,225
UNIVERSAL JOINT
Filed June 27, 1957 2 Sheets-Sheet 2

INVENTOR
RUDOLPH G. BIRR
BY Smith, Olsen, Baird & Miller
ATTY'S.

United States Patent Office 2,899,225
Patented Aug. 11, 1959

2,899,225

UNIVERSAL JOINT

Rudolph G. Birr, Lombard, Ill., assignor to American Linen Supply Co., Chicago, Ill., a corporation of Nevada Application June 27, 1957, Serial No. 668,374

12 Claims. (Cl. 287—20)

This invention relates to improvements in universal joints, and more particularly to a universal joint construction which, although it has a great variety of uses, is ideally suited for use as a flexible joint between the head of a floor brush or the like and a handle by which the brush may be manipulated, thereby permitting the brush to occupy substantially any angular position with respect to the end of the handle so that the brush may be conveniently and easily moved into areas that are awkward or difficult to reach.

One of the broad objects of the present invention is to provide a universal joint construction that has the combined attributes of being relatively inexpensive to manufacture and assemble, and being light in weight but relatively strong and durable so as to withstand heavy use over long periods of time. To this end, it is a further object of the invention to provide a universal joint that, except for two pivot pins employed, may be manufactured, if desired, entirely of sheet metal parts that may be formed on an ordinary punch press, thereby avoiding all castings and other relatively heavy parts that ordinarily add weight and expense to universal joints. Still another object of the invention is to provide a universal joint of the above character that is retained in its assembled condition by a novel interlocking relationship between certain of its major parts, thereby permitting quick and easy assembly of the joint. Yet another object of the invention is to provide a universal joint of the nature just described wherein certain of the major parts are in resilient or spring-pressed frictional engagement with each other in such a way as to give the joint a certain desired stiffness that will not be materially reduced by long use or by constant working or flexing of the joint.

These and other objects and advantages of the present invention will be apparent from the following description of a preferred embodiment thereof, taken with the accompanying drawings, wherein.

Figure 1:
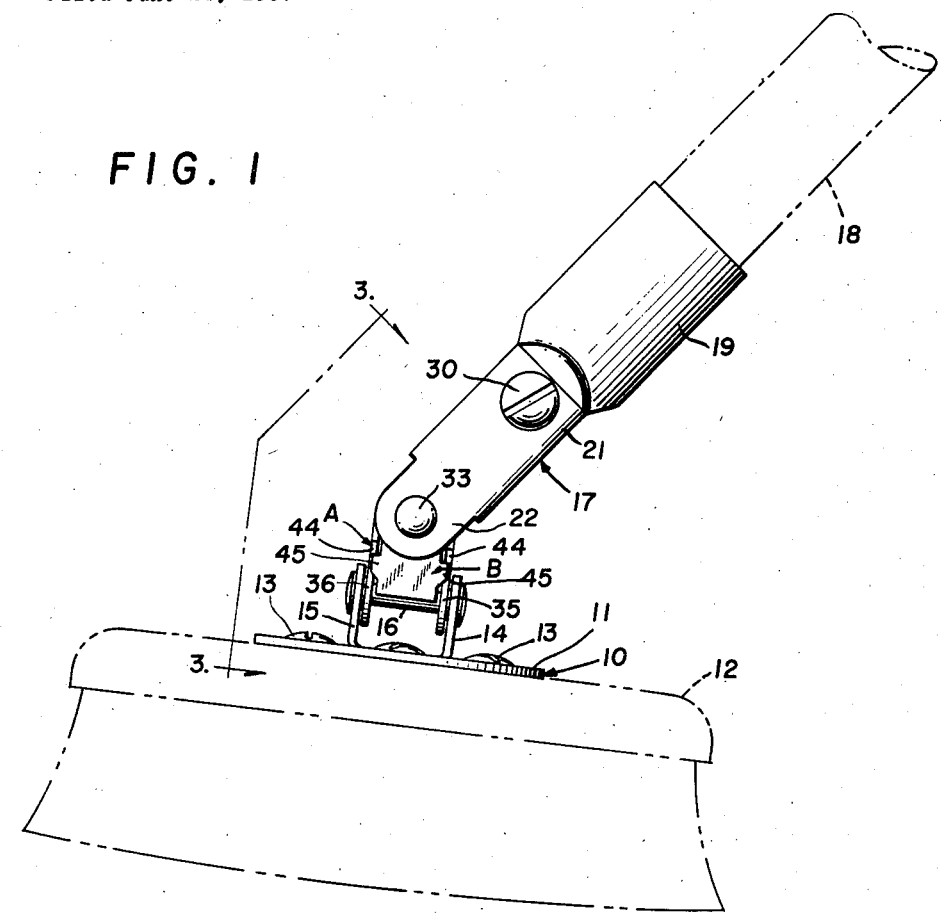
Fig. 1 is a side elevational view of a universal joint constructed in accordance with the invention, the joint being illustrated as being employed as a flexible connection between a handle and a head of a floor brush or the like, the latter two of which are indicated by broken lines.

Turning now to the drawings, the universal joint there shown comprises a lower end element, designated generally by the numeral 10, having a circular base portion 11 suitable for attachment to the back of the head of a tool or brush or the like, one form of a brush being illustrated in Fig. 1 by the broken lines 12. The base 11 of the end element 10 may be secured to the brush as by a plurality of screws 13, as shown, or other suitable fastening means may be provided for that purpose. The base element 11 has a pair of upstanding arms 14 and 15 struck from the body thereof, leaving corresponding openings 14a and 15a in the base. The upper ends of each of the upstanding arms 14 and 15 may be pleasingly rounded, as perhaps best seen in Fig. 3, and each of the arms is perforated to receive a pivot pin 16. This pivot pin extends between the upstanding arms 14 and 15 and may comprise a relatively long rivet having the usual head 16a, with the opposite end of the rivet being peened over as at 16b.

Figure 4:
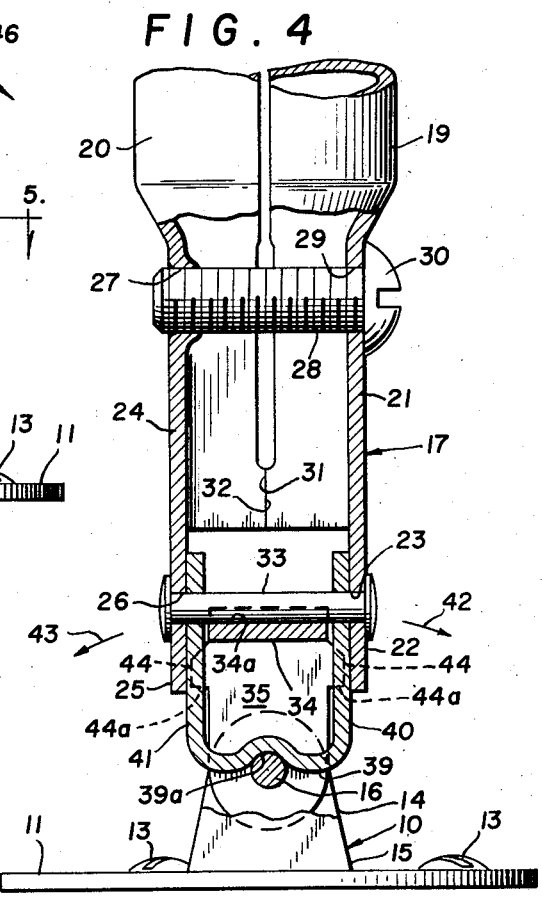
Fig. 4 is an enlarged section taken substantially along the line 4—4 in Fig. 5 and at right angles to the section shown in Fig. 2.
Figure 5:
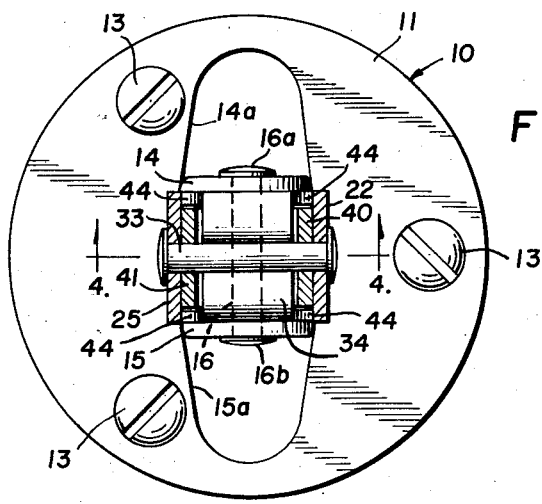
Fig. 5 is a horizontal section taken substantially along the line 5—5 in Fig. 3.

The opposite end element of the universal joint, in the present instance, is designated generally by the numeral 17. This end element is arranged to receive the handle 18, and for this purpose it includes a split upper cylindrical socket portion comprising two half-cylindrical elements 19 and 20. The lower end portion 21 of the half-cylindrical element 19 has a reduced radius, as illustrated, and on its lower extremity there is formed a downwardly extending arm 22 having an opening 23 therein (Fig. 4). The lower portion 24 of the half-cylindrical element 20 is likewise of reduced diameter and on its lower extremity there is formed another downwardly extending arm 25 corresponding to the arm 22 and, like the latter arm, having an opening 26 therein. The lower portion 24 of the half-cylindrical element 20 has a threaded opening 27 formed therein that is adapted to receive a screw 28 which extends through an unthreaded opening 29 in the lower portion 21 of the half-cylindrical element 19, the screw being provided with a head 30 by which it may be turned. It will be apparent that selective tightening and loosening of the screw 28 will tighten or loosen the half-cylindrical elements 19 and 20 upon the handle 18, thereby permitting convenient mounting or removal of the handle from the upper end of the present universal joint, the lower ends of the reduced portions 21 and 24 of the two half-cylindrical elements 19 and 20 being respectively provided with opposed surfaces 31 and 32 that abut each other to prevent the depending arms 22 and 25 from being moved too far toward each other during the tightening of the screw 28.

The openings 23 and 26 that are respectively provided in the depending arms 22 and 25 receive a pin 33 which in every respect may correspond to the previously described pin 16, it being noted that the opposite bifurcated end elements 10 and 17 of the universal joint are arranged so that the axes of the pins 16 and 33 are substantially at right angles to each other.

The two pins 16 and 33, and thus the opposite end elements 10 and 17 are joined together by a pair of separate but identical yoke members designated generally by the letters A and B. The first or lower yoke member A comprises a base portion 34 which joins two downwardly directed legs 35 and 36 that are journaled or pivotally received upon the pin 16 inside the upstanding arms 14 and 15 of the lower end element 10. This lower yoke member A, in the present instance, is preferably formed from a single piece of sheet metal and is hardened to give it a springlike resilience, the set of the metal being such that the legs 35 and 36 tend to spring outwardly in the direction indicated by the arrows 37 and 38 in Fig. 2, thereby causing the lower end portions of the respective legs 35 and 36 forcefully and resiliently to bear upon the inner surface of the upstanding arms 14 and 15. The spring-like nature of the lower yoke A thus spring-loads the frictional engagement of the lower end portions of the legs 35 and 36 with the upstanding arms 14 and 15 and avoids excessively free pivotation of the yoke upon the pin 16. Outwardly projecting or raised wear surfaces 35a and 36a are preferably formed on the outer surfaces of the lower portions of the respective legs 35 and 36 of the yoke by embossment or otherwise, so that the normal wearing action that takes place between the lower portions of these legs and the upstanding arms 14 and 15 when the joint assembly is pivoted about the pin 16, will not substantially reduce the friction therebetween and consequently will not tend to loosen the assembly for excessively free or easy pivotation about the pin 16. When the yoke A is formed upon a punch press so that the burred edge of the legs 35 and 36 are next to the inner surfaces of the arms 14 and 15, the embossed or raised wear surfaces 35a and 36a also serve to prevent the burred edges of the legs from cutting into the inner surfaces of the arms, thus avoiding the necessity of grinding or otherwise finishing the edges of the legs 35 and 36 of the yoke A.

The base portion 34 of the lower yoke A is provided with a longitudinally extending recess 34a which receives the pin 33 in an abutting fashion, so that the upper side of the base portion 34 of the lower yoke abuts the upper pin 33, while the legs 35 and 36 of the yoke are pivotally mounted upon the lower pin 16.

The second yoke member B, as previously indicated, is identical to the yoke member just described. It comprises a base portion 39 that abuts the lower pin 16, a longitudinally extending recess 39a, corresponding to the similar recess 35a in the base portion of the yoke A, being provided for receipt of the pin 16 in the manner perhaps best illustrated in Fig. 4. The base portion 39 of the second yoke B resides between the downwardly extending legs 35 and 36 of the first yoke and joins two upstanding legs 40 and 41 that are pivotally journaled on the upper pin 33 between the downwardly extending arms 22 and 25 of the upper end element 17 of the universal joint. The upper end portions of the legs 40 and 41 of the second yoke B may be provided with embossed wear surfaces like the surfaces 35a and 36a shown in Fig. 2, but for simplicity of illustration the wear surfaces on legs 40 and 41 of the second yoke have not been shown in the drawings. In any event, the second yoke, like the first yoke, is preferably formed from a single piece of sheet metal and is hardened to give it spring-like resilience, the set of the metal in the second yoke being such that its upwardly extending legs 40 and 41 tend to spring outwardly in the direction of the arrows 42 and 43 in Fig. 4, thereby causing the outer surfaces of the upstanding legs 40 and 41 to bear resiliently and frictionally upon the inner surfaces of the downwardly extending arms 22 and 25 of the upper end element of the joint to prevent excessively free and easy pivotation of the arms 22 and 25, or the legs 40 and 41, about the pin 33.

It will be observed that the abutment of the base portion 34 of the first yoke A with the upper pin 33, and the abutment of the base portion 39 of the second yoke B with the lower pin 16, prevents movement of the two end elements 10 and 17 of the universal joint toward each other. In other words, abutment of the two base portions of the two yokes with the respective pins prevents movement of the two pins toward each other. Telescopic movement between the two yokes, and consequent movement of the two pins 16 and 33 in a direction away from each other, is prevented by the coaction between shoulders that are formed on each of the outer edges of the legs of the two yoke members. To this end, each of the outer edges of the legs 35 and 36 of the first yoke member A has an outwardly extending projection 44 formed thereon (see Fig. 3). These projections overlap the adjacent edges of the legs 40 and 41 of the yoke B and provide downwardly facing shoulder surfaces 44a that are best seen in Figs. 3 and 4. Similarly, the opposite side edges of the legs 40 and 41 of the yoke B each has a projection 45 formed thereon (see Figs. 1, 2 and 3). These projections overlap the adjacent edges of the legs 35 and 36 of the yoke member A and provide upwardly facing shoulder surfaces 45a which are in abutting engagement with the corresponding downwardly facing surfaces 44a of the projections 44 on the edges of the legs of the yoke A. This overlapping and abutting engagement between the surfaces 44a and 45a, as perhaps best seen in Fig. 3, prevents relative movement between the two yoke members in a direction that would bring their respective base portions 34 and 39 closer to each other, and thus prevents corresponding separating movement of the two pins 16 and 33 and the two opposite end elements 10 and 17.

At the same time, the overlapping of the projections 44 on the yoke A over the side edges of the legs of the yoke B, and the corresponding overlapping of the projections 45 on the yoke B over the side edges of the legs of the yoke A, together with the disposition of the base portion of each yoke between the legs of the other, prevents substantial relative twisting movement between the two yokes. It will consequently be understood that the present universal joint construction may be subjected to, and will transmit, a very considerable amount of torque. Torque applied, for example, to the handle 18 will be transmitted by the upper end element 17 of the joint, to the yoke B through the pin 33 upon which that yoke is pivotally mounted. The torque applied to the yoke B will be transmitted to the yoke A by the projections 45 on the yoke B, which overlap and confine the side edges of the legs 35 and 36 of the yoke A, and also by the base portion 39 of the yoke B which resides between the legs of the yoke A. The torque thus transmitted to the yoke A will, of course, be transmitted to the lower end element 10 of the joint assembly by the pin 16 upon which the yoke A is pivotally mounted.

The above explained interlocking relationship between the major parts of the present universal joint, and the results that flow therefrom, can be summarized by saying that the intermediate cage-like structure provided by the two yokes A and B joins together the opposite end elements 10 and 17 of the joint and is retained in its assembled state (without axial separation or collapse) by the abutment of the base portions of the yokes with the respective pins 16 and 33, and by the overlapping engagement between the shoulder surfaces 44a and 45a of the yokes. The transmission of torque by this intermediate cage-like structure, on the other hand, is accomplished by the fact that the projections 44 and 45 formed on the edges of the legs of the two yokes overlap, in each instance, the side edges of the other yoke, and by the further fact that the base portion of each yoke is disposed between the legs of the other.

Figure 2:
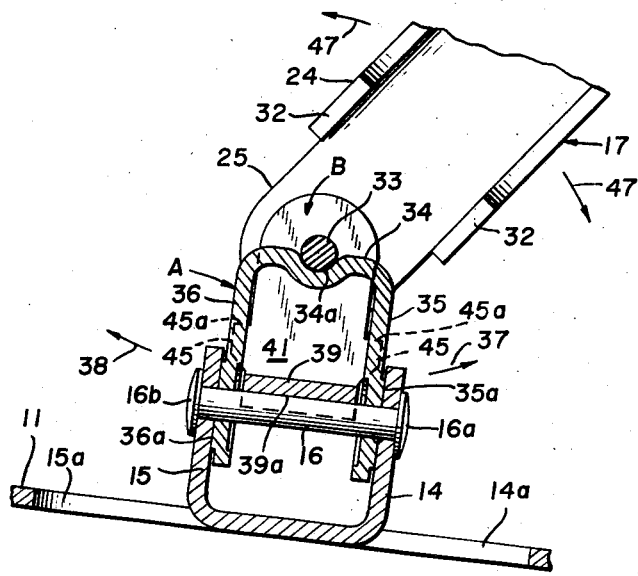
Fig. 2 is an enlarged vertical axial cross-section taken substantially through the center of the joint and substantially along the line 2—2 in Fig. 3.
Figure 3:
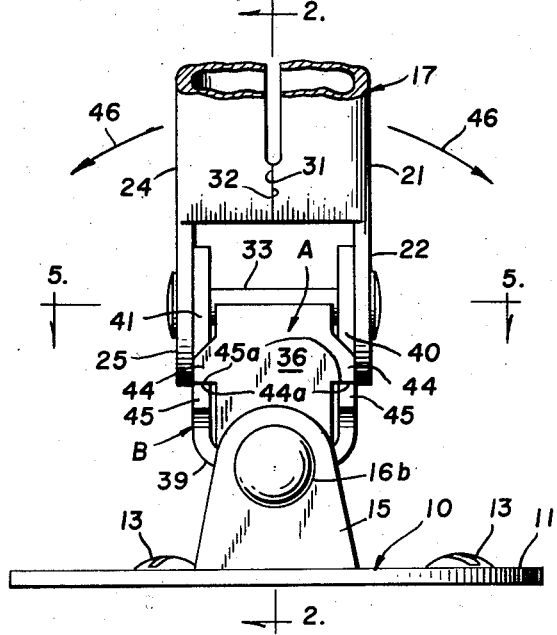
Fig. 3 is an enlarged side view of the joint taken substantially along the line 3—3 in Fig. 1.

It will of course be understood that the disposition of the two pivot pins 16 and 33 at right angles to each other permits the upper end element 17, and thus the handle 18, to assume any desired angular position with respect to the lower end element 10 and the brush 12 or other device that may be attached to the latter end element, pivotation being available about the pin 16 in the directions indicated by the arrows 46 in Fig. 3 and about the pin 33 in the directions of the arrows 47 in Fig. 2. It should also be understood that when the present universal joint is employed where it is desired that the joint work or pivot easily and freely, the two yokes A and B need not be spring-like and their respective legs need not bear resiliently against the inner surfaces of the arms of the end elements. However, in the embodiment of the invention that is illustrated in the drawings and described in detail above, the resilient bearing of the legs of the yokes upon the inner surfaces of the arms of the end elements retards or brakes the pivoting movements of the parts of the joint and thus permits a workman to have complete control at all times over the brush or tool fastened to the lower end of the joint. The resilience or flexibility of the legs of the two yokes is, of course, a function of their respective lengths, and it will be understood that the presence of the pin receiving recesses 34a and 39a in the base portions 34 and 39 of the yokes, while not necessary in some instances, permits the legs to be somewhat longer than they would otherwise be and this adds to their flexibility.

Due to the fact that all of the parts of the present universal joint, except for the two pins 16 and 33, may be formed of sheet metal, it will be appreciated that the joint is relatively very light in weight and relatively inexpensive to produce. Assembly is easily and quickly accomplished merely by assembling the sheet metal parts in the manner illustrated, and by inserting the pins 16 and 33, after which one end of each pin may be peened over to keep the pins in place.

The foregoing description has been given for clearness of understanding only, and no unnecessary limitations are intended thereby, for it will be understood that the invention may be embodied in various forms of universal joints which come within the scope of the appended claims.

I claim:

1. A universal joint comprising, a pair of bifurcated end elements each having a pair of spaced apart arms, first and second pivot pins extending between the respective arms of said end elements, said end elements being arranged so that the axes of said pins are substantially at right angles to each other, a first intermediate yoke member having a base portion and a pair of spaced apart legs extending therefrom, said legs being journaled on said first pin with the base portion of said yoke abutting said second pin, a separate second intermediate yoke member having a base portion and a pair of spaced apart legs extending therefrom, said legs of said second yoke member being journaled on said second pin with said base portion of said second yoke member abutting said first pin, and means for retaining said base portions of said yoke members in abutment with said respective pins, the abutment of said base portions of said yoke members with said respective pins preventing substantial relative movement of said end elements toward each other.

2. A universal joint comprising, first and second bifurcated end elements each having a pair of spaced apart arms, a first intermediate yoke member having a base portion and a pair of spaced apart legs extending therefrom, a pin pivotally connecting the legs of said first intermediate yoke member to the arms of the first of said end elements, a separate second intermediate yoke member having a base portion and a pair of legs extending therefrom, said base portion of said second yoke member being disposed between the legs of said first yoke member and abutting said pin, a second pin pivotally connecting the legs of said second yoke member to the arms of the second of said end elements, the base portion of said first intermediate yoke member abutting said last mentioned pin, and means for retaining said base portions of said yoke members in abutment with said respective pins, the abutment of said base portions of said yoke members with said respective pins preventing substantial relative movement of said end elements toward each other.

3. A universal joint comprising, first and second bifurcated end elements each having a pair of spaced apart arms, a first intermediate yoke member having a base portion and a pair of spaced apart legs extending therefrom, a pin pivotally connecting the legs of said first intermediate yoke member to the arms of the first of said end elements, a separate second intermediate yoke member having a base portion and a pair of legs extending therefrom, said base portion of said second yoke member being disposed between the legs of said first yoke member and abutting said pin, a second pin having its axis substantially normal to the axis of said first mentioned pin for pivotally connecting the legs of said second yoke member to the arms of the second of said end elements, the base portion of said first intermediate yoke member abutting said second pin, and means for retaining said base portions of said yoke members in abutment with said respective pins, the abutment of said base portions of said yoke members with said respective pins preventing substantial relative movement of said end elements toward each other.

4. A universal joint comprising, first and second bifurcated end elements each having a pair of spaced apart arms, a first intermediate yoke member having a base portion and a pair of spaced apart legs extending therefrom, a pin pivotally connecting the legs of said first intermediate yoke member to the arms of the first of said end elements, a separate second intermediate yoke member having a base portion and a pair of legs extending therefrom, said base portion of said second yoke member abutting said pin, means spacing said base portions apart, and a second pin having its axis substantially normal to the axis of said first mentioned pin for pivotally connecting the legs of said second yoke member to the arms of the second of said end elements, the base portion of said first intermediate yoke member abutting said second pin, the abutment of said base portions of said yoke members with said respective pins preventing substantial relative movement of said end elements toward each other.

5. A universal joint comprising, first and second bifurcated end elements each having a pair of spaced apart arms, a first intermediate yoke member having a base portion and a pair of spaced apart legs extending therefrom, a pin pivotally connecting the legs of said first intermediate yoke member to the arms of the first of said end elements, a separate second intermediate yoke member having a base portion disposed between the legs of said first yoke member and abutting said pin and having a pair of legs straddling the base portion of said first yoke member, means spacing said base portions apart, and a second pin having its axis substantially normal to the axis of said first mentioned pin for pivotally connecting the legs of said second yoke member to the arms of the second of said end elements, the base portion of said first intermediate yoke member abutting said second pin, the abutment of said base portions of said yoke members with said respective pins preventing substantial relative movement of said end elements toward each other.

6. A universal joint comprising, first and second bifurcated end elements each having a pair of spaced apart arms, a first intermediate yoke member having a base portion and a pair of spaced apart legs extending therefrom, a pin pivotally connecting the legs of said first intermediate yoke member to the arms of the first of said end elements, a separate second intermediate yoke member having a base portion disposed between the legs of said first yoke member and abutting said pin and having a pair of legs straddling the base portion of said first yoke member, a second pin having its axis substantially normal to the axis of said first mentioned pin for pivotally connecting the legs of said second yoke member to the arms of the second of said end elements, the base portion of said first intermediate yoke member abutting said second pin, and a shoulder on each of the lateral edges of the legs of said yoke members, the shoulders on the legs of said first yoke member being in overlapping engagement with the shoulders on the legs of said second yoke member so as to prevent substantial relative movement of said end elements in a direction away from each other, the abutment of said base portions of said yoke members with said respective pins preventing substantial relative movement of said end elements toward each other.

7. A universal joint comprising, first and second bifurcated end elements each having a pair of spaced apart arms, a first intermediate yoke member having a base portion and a pair of spaced apart legs extending therefrom, a pin pivotally connecting the legs of said first intermediate yoke member to the arms of the first of said end elements, a separate second intermediate yoke member having a base portion disposed between the legs of said first yoke member and abutting said pin and having a pair of legs straddling the base portion of said first yoke member, a second pin having its axis substantially normal to the axis of said first mentioned pin for pivotally connecting the legs of said second yoke member to the arms of the second of said end elements, the base portion of said first intermediate yoke member abutting said second pin, and a projection on each of the lateral edges of the legs of said yoke members providing a shoulder thereon, the projections on the legs of each of said yoke members overlapping the lateral edges of the legs of the other and with said shoulders on each yoke member being in overlapping engagement with the shoulder of the other, said yoke members being retained in substantially fixed position with respect to each other by the abutment of said base portions against said pins, by the overlapping of said projections with the lateral edges of the legs of the other yoke member, and by said overlapping engagement of said shoulders.

8. The combination set forth in claim 7, wherein an outer end portion of each of the legs of said yoke members is in frictional engagement with an adjacent portion of one of said end elements.

9. The combination set forth in claim 7, wherein an outer end portion of each of the legs of said yoke members is in frictional engagement with an adjacent portion of one of said arms of said end elements.

10. The combination defined by claim 9, wherein said outer end portions of the legs of at least one of said yoke members is embossed to provide wear surfaces in frictional engagement with said adjacent portions of the arms of one of said end elements.

11. The combination set forth in claim 7, wherein each of said legs of said yoke members is a resilient spring and is in spring-pressed frictional engagement with an adjacent portion of one of said arms of said end elements.

12. The combination defined by claim 11, wherein the distance between said pins is fixed and wherein the pin abutting area of each of the base portions of said yoke members is recessed, whereby said legs of said yoke members may be of maximum length to provide maximum resilience therein.

References Cited in the file of this patent

UNITED STATES PATENTS

| 2,407,421 | Herold | Sept. 10, 1946 |

FOREIGN PATENTS

| 1,085,863 | France | Feb. 8, 1955 |